(12) United States Patent
Kwon et al.

(10) Patent No.: US 9,103,063 B2
(45) Date of Patent: Aug. 11, 2015

(54) LAUNDRY MACHINE WITH SUSPENSION ASSEMBLY

(75) Inventors: Ig Geun Kwon, Changwon-si (KR); Jae Hyun Choi, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 906 days.

(21) Appl. No.: 13/266,895

(22) PCT Filed: May 28, 2010

(86) PCT No.: PCT/KR2010/003410
§ 371 (c)(1),
(2), (4) Date: Oct. 28, 2011

(87) PCT Pub. No.: WO2010/137913
PCT Pub. Date: Dec. 2, 2010

(65) Prior Publication Data
US 2012/0042699 A1 Feb. 23, 2012

(30) Foreign Application Priority Data

May 28, 2009 (KR) .................. 10-2009-0047192
Aug. 27, 2009 (KR) .................. 10-2009-0079948
May 24, 2010 (KR) .................. 10-2010-0047875

(51) Int. Cl.
*D06F 37/22* (2006.01)
*D06F 37/26* (2006.01)
*D06F 39/12* (2006.01)
*F16F 15/02* (2006.01)

(52) U.S. Cl.
CPC .............. *D06F 37/22* (2013.01); *D06F 37/268* (2013.01); *D06F 39/12* (2013.01); *F16F 15/022* (2013.01); *F16F 2228/06* (2013.01)

(58) Field of Classification Search
CPC ....... D06F 37/22; D06F 37/20; D06F 37/268; D06F 37/269
USPC ..................................... 68/23.1, 140
See application file for complete search history.

(56) References Cited

U.S. PATENT DOCUMENTS

| | | | |
|---|---|---|---|
| 3,275,152 A | 9/1966 | Searle | 210/64 |
| 3,387,310 A | 6/1968 | Marshall | 8/158 |
| 3,509,742 A | 5/1970 | Bauer | 68/23.1 |

(Continued)

FOREIGN PATENT DOCUMENTS

| | | |
|---|---|---|
| CN | 1179489 A | 4/1998 |
| CN | 1508349 A | 6/2004 |

(Continued)

OTHER PUBLICATIONS

Chinese Office Action dated Dec. 25, 2012 issued in Application No. 200980155851.0 with English translation).

(Continued)

*Primary Examiner* — Michael Barr
*Assistant Examiner* — Irina Graf
(74) *Attorney, Agent, or Firm* — Ked & Associates, LLP (57) ABSTRACT

A laundry machine is provided, in which a displacement of a drum may be relatively smaller in a left-and-right direction than in other directions. To this end, a suspension assembly may be configured such that a stiffness thereof for the displacement of the drum is greater in the left-and-right direction than in an up-and-down or front-and-rear direction. Thus, a laundry machine having an enlarged capacity is provided.

8 Claims, 6 Drawing Sheets

(56) References Cited

U.S. PATENT DOCUMENTS

| | | | |
|---|---|---|---|
| 4,033,047 A | 7/1977 | Kawai | 34/82 |
| 4,204,339 A | 5/1980 | Muller | 34/75 |
| 4,891,892 A | 1/1990 | Narang | 34/86 |
| 4,899,462 A | 2/1990 | Putnam et al. | 34/19 |
| 5,231,805 A | 8/1993 | Sander | 51/429 |
| 5,259,218 A | 11/1993 | Broadbent | 68/12.06 |
| 5,582,040 A | 12/1996 | Khan | 68/23.2 |
| 5,711,170 A | 1/1998 | Johnson | 68/3 |
| 5,735,006 A | 4/1998 | Vande Haar | 8/158 |
| 6,256,823 B1 | 7/2001 | Kronbetter et al. | 8/158 |
| 6,557,383 B1 | 5/2003 | Ito et al. | 68/23.2 |
| 7,251,963 B2 | 8/2007 | Kim et al. | 68/196 |
| 7,398,662 B2 | 7/2008 | Kim et al. | 68/23 |
| 8,468,711 B2 | 6/2013 | Kim et al. | 34/82 |
| 2004/0107742 A1 | 6/2004 | Kim et al. | 68/24 |
| 2004/0123631 A1 | 7/2004 | Chang | |
| 2004/0148978 A1 | 8/2004 | Kim et al. | 68/23 |
| 2004/0163426 A1 | 8/2004 | Kim et al. | 68/23 |
| 2004/0221474 A1 | 11/2004 | Slutsky et al. | 34/319 |
| 2004/0226321 A1 | 11/2004 | Park et al. | 68/23.1 |
| 2004/0261469 A1 | 12/2004 | Park et al. | 68/23 |
| 2005/0183472 A1 | 8/2005 | Choi | 68/23.1 |
| 2005/0262879 A1 | 12/2005 | Kim et al. | 68/3 |
| 2005/0274159 A1 | 12/2005 | Jeon et al. | 68/23.1 |
| 2006/0010935 A1 | 1/2006 | Park et al. | 68/3 |
| 2006/0016228 A1 | 1/2006 | Chang et al. | 68/23.1 |
| 2006/0053838 A1 | 3/2006 | Inuzuka et al. | 68/3 |
| 2006/0075791 A1 | 4/2006 | Seo et al. | 68/23.1 |
| 2006/0101865 A1 | 5/2006 | Jeon et al. | 68/3 |
| 2006/0169006 A1 | 8/2006 | Lim et al. | 68/13 |
| 2006/0174663 A1 | 8/2006 | Cimetta et al. | 68/3 |
| 2006/0174665 A1 | 8/2006 | Namkung et al. | 68/140 |
| 2007/0051142 A1 | 3/2007 | Lim et al. | 68/139 |
| 2007/0074543 A1 | 4/2007 | Lim et al. | 68/140 |
| 2007/0227200 A1 | 10/2007 | Kim et al. | 68/140 |
| 2007/0289339 A1 | 12/2007 | Lim | 68/23.1 |
| 2008/0099052 A1 | 5/2008 | Lee et al. | 134/18 |
| 2008/0264114 A1 | 10/2008 | Jang et al. | 68/139 |
| 2008/0307833 A1 | 12/2008 | Chang et al. | 68/23.1 |
| 2009/0056389 A1 | 3/2009 | Pinkowski et al. | |
| 2009/0178445 A1 | 7/2009 | Brinkmann | 68/23 |
| 2011/0173834 A1 | 7/2011 | Arrigoni et al. | 34/90 |
| 2013/0139402 A1 | 6/2013 | Hong | 34/427 |
| 2013/0255099 A1 | 10/2013 | Cavarretta et al. | 34/108 |

FOREIGN PATENT DOCUMENTS

| | | |
|---|---|---|
| CN | 1511996 A | 7/2004 |
| CN | 1540085 A | 10/2004 |
| CN | 1548627 A | 11/2004 |
| CN | 1707010 A | 12/2005 |
| CN | 1724742 A | 1/2006 |
| CN | 1730776 A | 2/2006 |
| CN | 1730777 A | 2/2006 |
| CN | 1730778 A | 2/2006 |
| CN | 1844543 A | 10/2006 |
| CN | 1906351 A | 1/2007 |
| CN | 1940166 A | 4/2007 |
| CN | 101046046 A | 10/2007 |
| CN | 101381946 A | 3/2009 |
| DE | 25 03 576 A1 | 8/1976 |
| DE | 3438575 A1 | 4/1986 |
| DE | 41 04 450 A1 | 8/1992 |
| DE | 44 13 069 A1 | 10/1994 |
| DE | 297 16 968 U1 | 11/1997 |
| DE | 198 56 973 A1 | 6/1999 |
| DE | 103 42 254 B3 | 11/2004 |
| DE | 10 2006 012 035 B3 | 3/2007 |
| DE | 10 2006 031 352 A1 | 1/2008 |
| EP | 0 152 745 A2 | 8/1985 |
| EP | 0 443 361 A1 | 8/1991 |
| EP | 0 648 885 A1 | 4/1995 |
| EP | 1 079 014 A1 | 2/2001 |
| EP | 1 270 791 A2 | 1/2003 |
| EP | 1 433 890 A2 | 6/2004 |
| EP | 1 445 368 A2 | 8/2004 |
| EP | 1 529 869 A2 | 5/2005 |
| EP | 1 605 088 A2 | 12/2005 |
| EP | 1 619 286 A2 | 1/2006 |
| EP | 1 688 524 A1 | 8/2006 |
| EP | 1 688 525 A1 | 8/2006 |
| EP | 1 688 531 A1 | 8/2006 |
| EP | 1 690 969 A1 | 8/2006 |
| EP | 1 710 340 A2 | 10/2006 |
| EP | 1 722 025 A1 | 11/2006 |
| EP | 1 746 192 A2 | 1/2007 |
| EP | 1746192 A2 | 1/2007 |
| EP | 1 770 199 A2 | 4/2007 |
| EP | 1 840 257 A1 | 10/2007 |
| EP | 1 857 583 A1 | 11/2007 |
| EP | 1 881 099 A1 | 1/2008 |
| EP | 1 975 298 A1 | 10/2008 |
| EP | 2 053 157 A1 | 4/2009 |
| EP | 2 075 364 A1 | 7/2009 |
| EP | 2 078 777 A1 | 7/2009 |
| EP | 1840257 B1 | 8/2011 |
| EP | 2 390 401 A2 | 11/2011 |
| EP | 2 435 624 A2 | 4/2012 |
| FR | 2 931 489 A1 | 11/2009 |
| GB | 913801 A | 12/1962 |
| GB | 1181797 | 2/1970 |
| GB | 1181797 A | 2/1970 |
| GB | 2 091 123 A | 7/1982 |
| GB | 2 279 968 A | 1/1995 |
| JP | H10-211393 A | 8/1998 |
| JP | 3502039 B2 | 3/2004 |
| JP | 2006-061613 A | 3/2006 |
| JP | 2008-006045 A | 1/2008 |
| JP | 2008-259665 A | 10/2008 |
| JP | 2009-028400 A | 2/2009 |
| JP | 2009-060990 A | 3/2009 |
| KR | 10-2003-0092185 A | 12/2003 |
| KR | 10-2005-0108609 | 11/2005 |
| KR | 10-2005-0108609 A | 11/2005 |
| KR | 10-2006-0095816 A | 9/2006 |
| KR | 10-2007-0059431 A | 6/2007 |
| KR | 10-2007-0101732 A | 10/2007 |
| KR | 10-2008-0002475 A | 1/2008 |
| KR | 10-0808192 B1 | 2/2008 |
| KR | 10-2008-0072187 A | 8/2008 |
| RU | 2 085 641 C1 | 7/1997 |
| RU | 2 182 197 C2 | 5/2002 |
| RU | 2 303 092 C1 | 7/2007 |
| RU | 2 303 668 C2 | 7/2007 |
| WO | WO 01/96647 A1 | 12/2001 |
| WO | WO 2005/017249 A1 | 2/2005 |
| WO | WO 2007/105843 A1 | 9/2007 |
| WO | WO 2008/003592 A1 | 1/2008 |
| WO | WO 2008/007888 A2 | 1/2008 |
| WO | WO 2008/103007 A2 | 8/2008 |
| WO | WO 2009/040302 A1 | 4/2009 |
| WO | WO 2009/050095 A1 | 4/2009 |
| WO | WO 2009/148251 A2 | 12/2009 |

OTHER PUBLICATIONS

Chinese Office Action dated Dec. 28, 2012 issued in Application No. 200980155608.9 (with English translation).

European Office Action dated Jan. 2, 2014 issued in Application No. 10 780 822.2.

Russian Office Action dated Jan. 22, 2014 issued in Application No. 2011132074 (with English translation.).

Russian Office Action dated Jan. 30, 2014 issued in Application No. 2011147481 (with English translation).

European Office Action dated Feb. 5, 2014 issued in Application No. 10 780 817.2.

European Search Report dated Feb. 25, 2014 issued in Application No. 10 78 0803.2.

European Search Report dated Feb. 25, 2014 issued in Application No. 10 78 0805.7.

European Search Report dated Feb. 26, 2014 issued in Application No. 10 78 0804.0.

(56) References Cited

OTHER PUBLICATIONS

European Search Report dated Feb. 26, 2014 issued in Application No. 10 78 0806.5.
European Notice of Allowance dated Feb. 28, 2014 issued in Application No. 10 78 0823.0.
European Search Report dated Mar. 19, 2014 issued in Application No. 13 19 8677.0.
United States Office Action dated Apr. 11, 2014 issued in U.S. Appl. No. 13/320,697.
Chinese Office Action dated Mar. 28, 2013 issued in Application No. 201080021257.5 with English translation).
Russian Decision to Grant a Patent dated May 15, 2014 issued in Application No. 2011147481 (with English translation).
United States Office Action dated Jun. 12, 2014 issued in U.S. Appl. No. 13/318,655.
Chinese Office Action dated Jun. 4, 2013 issued in Application No. 201080021259.4 (with English translation).
Chinese Office Action dated Jun. 4, 2013 issued in Application No. 201080022490.5 (with English translation).
Russian Decision to Grant a Patent dated Aug. 29, 2014 issued in Application No. 2011146320/12 (with English translation).
Russian Decision to Grant a Patent dated Aug. 29, 2014 issued in Application No. 2011147482/12 (with English translation).
United States Office Action dated Nov. 6, 2014 issued in U.S. Appl. No. 13/142,986.
United States Office Action dated Nov. 18, 2014 issued in U.S. Appl. No. 13/143,032.
United States Office Action dated Nov. 20, 2014 issued in U.S. Appl. No. 13/259,016.
International Search Report issued in PCT Application No. PCT/KR2010/003410 dated May 28, 2010.
International Search Report and Written Opinion dated Sep. 14, 2010 issued in Application No. PCT/KR2009/007869.
International Search Report and Written Opinion dated Oct. 27, 2010 issued in Application No. PCT/KR2010/003379.
International Search Report and Written Opinion dated Oct. 27, 2010 issued in Application No. PCT/KR2010/003400.
International Search Report and Written Opinion dated Nov. 24, 2010 issued in Application No. PCT/KR2010/003376.
International Search Report and Written Opinion dated Nov. 24, 2010 issued in Application No. PCT/KR2010/003377.
International Search Report and Written Opinion dated Nov. 24, 2010 issued in Application No. PCT/KR2010/003378.
International Search Report and Written Opinion dated Nov. 29, 2010 issued in Application No. PCT/KR2010/003404.
International Search Report and Written Opinion dated Nov. 29, 2010 issued in Application No. PCT/KR2010/003405.
International Search Report and Written Opinion dated Nov. 29, 2010 issued in Application No. PCT/KR2010/003409.
International Search Report and Written Opinion dated Nov. 29, 2010 issued in Application No. PCT/KR2010/003410.
International Search Report and Written Opinion dated Jan. 21, 2011 issued in Application No. PCT/KR2010/003406.
International Search Report and Written Opinion dated Jan. 31, 2011 issued in Application No. PCT/KR2010/003408.
International Search Report and Written Opinion dated Jul. 19, 2011 issued in Application No. PCT/KR2009/007963.
International Search Report and Written Opinion dated Sep. 21, 2011 issued in Application No. PCT/KR2009/007960.
European Search Report dated Jul. 31, 2012 issued in Application No. 09 83 6377.
European Search Report dated Oct. 19, 2012 issued in Application No. 10 78 0817.
European Search Report dated Oct. 22, 2012 issued in Application No. 10 78 0819.
European Search Report dated Oct. 24, 2012 issued in Application No. 10 78 0823.
European Search Report dated Oct. 26, 2012 issued in Application No. 10 78 0820.
United States Office Action dated Nov. 14, 2013 issued in U.S. Appl. No. 13/266,838.
Chinese Office Action dated Mar. 5, 2013 issued in Application No. 201080017293.4 with English translation).
United States Office Action dated Aug. 4, 2014 issued in U.S. Appl. No. 13/318,655.
United States Office Action dated Sep. 3, 2014 issued in U.S. Appl. No. 13/142,620.
United States Office Action dated Sep. 9, 2014 issued in U.S. Appl. No. 13/259,709.
United States Office Action dated Oct. 2, 2014 issued in U.S. Appl. No. 13/259,832.
ABT-MAH2400WH.pdf, web page posted on www.abt.com on Mar. 2009; https://web.archive.org/web/20090301015816/http://www.abt.com/_product/17027/Maytag-MAH2400AWW.html; retrieved by Examiner on Mar. 19, 2015.
Maytag-MAH2400AWW.pdf, web page posted on www.maytag.com on May 2005; https//web.archive.org/web/20050502164236/http://www.maytag.com/mths/products/product.jsp?model=MAH2400AWWW; retrieved by Examiner on Mar. 19, 2015.
Amazon-MAH2400AWW.pdf, web page posted on www.amazon.com on Mar. 2015; http:/www.amazon.com/Maytag-MAH2400AWWCompact-Front-Load-Capacity/dp/8000UVYEOM/ref=cm_cd_ql_qh_dp_t; retrieved by Examiner on Mar. 19, 2015.
U.S. Office Action issued in U.S. Appl. No. 13/143,032 dated Mar. 16, 2015.
U.S. Office Action issued in U.S. Appl. No. 13/259,016 dated Mar. 24, 2015.
U.S. Office Action issued in U.S. Appl. No. 13/318,549 dated Mar. 26, 2015.
U.S. Office Action issued in U.S. Appl. No. 13/320,697 dated Apr. 9, 2015.
United States Final Office Action dated Jan. 9, 2015 issued in U.S. Appl. No. 13/318,655.
United States Final Office Action dated Jan. 21, 2015 issued in U.S. Appl. No. 13/142,620.
U.S. Office Action issued in U.S. Appl. No. 13/259,754 dated May 6, 2015.
U.S. Final Office Action issued in U.S. Appl. No. 13/319,167 dated May 18, 2015.
U.S. Office Action issued in U.S. Appl. No. 13/142,986 dated Jun. 5, 2015.
U.S. Office Action issued in U.S. Appl. No. 13/259,016 dated Jun. 17, 2015.

LAUNDRY MACHINE WITH SUSPENSION ASSEMBLY

TECHNICAL FIELD

The present invention relates to a laundry machine.

Generally, laundry machines are categorized into washers and dryers. Such washers include pulsator type washing machines and drum type washing machines and washing machines having washing and drying functions. In general, dryers are appliances for drying wet laundry using hot air and the like.

BACKGROUND ART

Such a drum type washing machine includes a tub arranged horizontally therein and a drum arranged in the tub horizontally. Laundry such as clothes is put into the drum and tumbled by the drum being rotated.

The drum is rotatably located in the tub.

A shaft is connected to the drum and a motor is connected to the shaft directly or indirectly by a belt. As a result, when the motor is rotated, the drum is rotated.

The drum is rotated during rinsing and drying-spinning cycles as well as a washing cycle. The drum vibrates while rotating.

In conventional laundry machines, the shaft passes through the tub. The bearing housing is provided to rotatably support the shaft. The bearing housing is insert-molded with the tub or attached to a rear wall thereof.

The above bearing housing supports the shaft and the vibration of the drum is transmitted to the tub and the bearing housing via the shaft.

Because of that, the tub vibrates together with the drum and a damping supporting material is connected to the tub to reduce the vibration.

That is, the conventional laundry machine is structured to make the vibration of the drum transmitted to the tub directly as and to make the damping supporting material support connected to the support the vibration.

DISCLOSURE OF INVENTION

Technical Problem

The present invention is for enlarging the capacity for treating laundry. To this end, a size or volumn of a drum may be enlarged.

Solution to Problem

The laundry machine of the present invention may include a suspension assembly connected to the driving unit for supportably buffering vibration of the drum. Though, in the related art, the suspension assembly is connected to the tub for buffering both the tub and the drum, the laundry machine of the present invention may have a structure in which vibration of the drum is isolated from the vibration of the tub. In the meantime, the tub is supported rigidly more than the drum being supported by the suspension assembly.

An example in which the tub is supported rigidly more than the drum being supported by the suspension assembly is as follows.

First, at least a portion of the tub can be formed as one unit with the cabinet.

Second, the tub may be supportably connected with screws, rivets, rubber bushings or supportably fixed by welding, adhesive sealing. In this case, such a connection member has rigidity greater than the suspension assembly with respect to a direction of a major vibration of the drum.

Moreover, a flexible member may be included for reducing transmission of vibration from the drum to the tub. The flexible member may be made to make flexible connection of the tub to the driving unit for preventing leakage from the driving unit and the tub and enabling the driving unit to move relative to the tub. Such a flexible member may be the rear gasket.

In an embodiment of the present invention, the sum of the up/down direction gaps G1+G3 is greater than the sum of the left/right direction gaps G5+G6.

In another embodiment, the laundry opening in the drum is the same or larger than a diameter of the laundry opening in the tub. In this instance, the laundry opening of the drum is positioned in rear of a front inside wall of the tub. In this case, the drum is fully positioned in a space between the front wall and the rear wall of the tub.

In an embodiment, a displacement of the drum may be relatively smaller in a left-and-right direction than in other directions. To this end, the suspension assembly may be configured that a stiffness thereof for a displacement of the drum is greater in a left-and-right direction than in an up-and-down or front-and-rear direction.

The diameter of the drum may be limited by the diameter of the tub and the movement of the drum. By reducing the amount of the movement of the drum, the enlarging of the diameter of the drum may be able to be made.

The foregoing embodiments can be combined in various forms as far as the embodiments are not contradictory to one another, to produce another embodiment.

Advantageous Effects of Invention

The present invention may provide with a laundry machine having an enlarged capacity.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

MODE FOR THE INVENTION

Reference will now be made in detail to the specific embodiments of the present invention, examples of which are illustrated in the accompanying drawings. Wherever possible, the same reference numbers will be used throughout the drawings to refer to the same or like parts.

Figure 1:
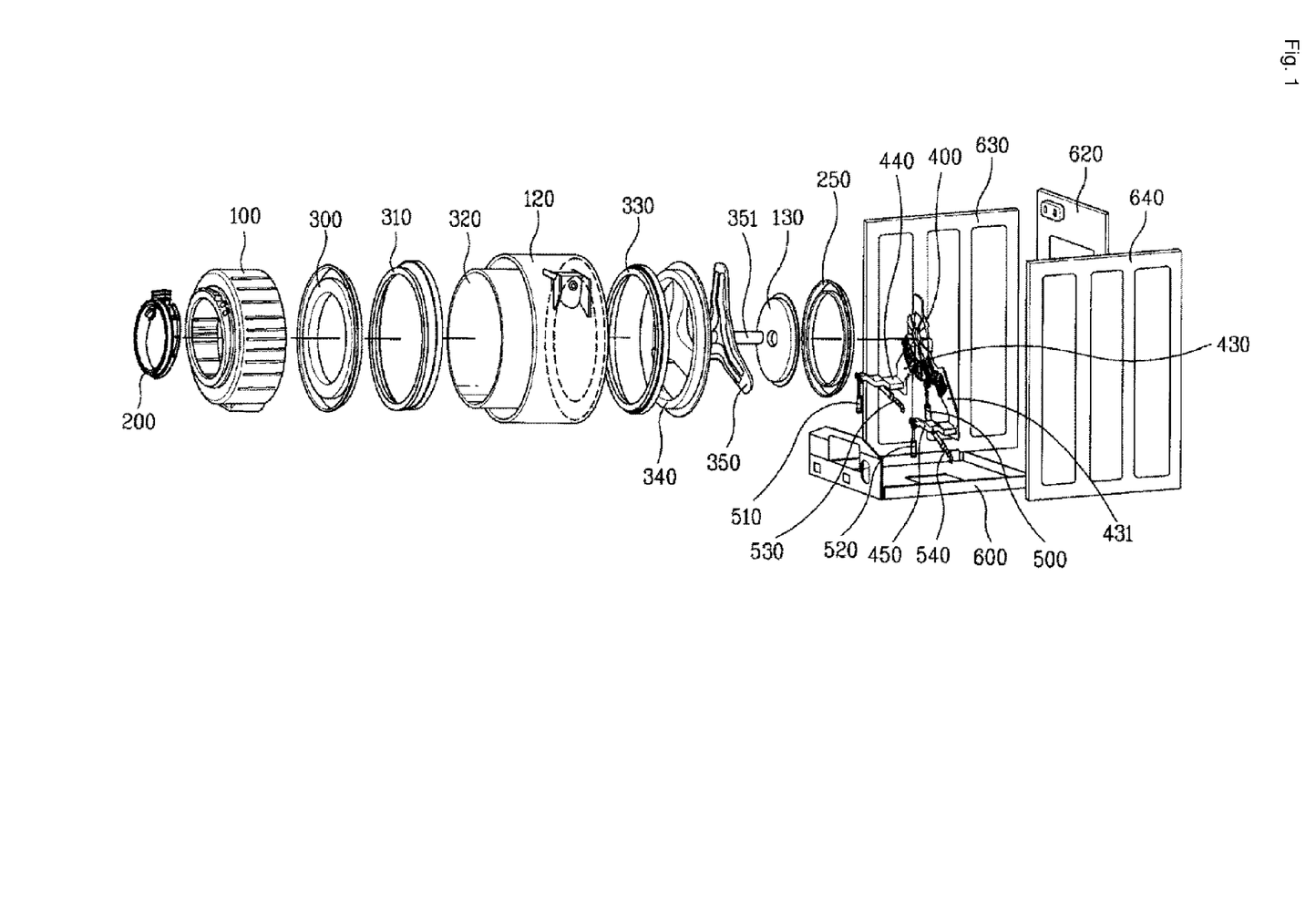
FIG. 1 illustrates an exploded perspective view of a laundry machine in accordance with a preferred embodiment of the present invention.

FIG. 1 illustrates an exploded perspective view of a laundry machine in accordance with a preferred embodiment of the present invention.

The laundry machine has a tub fixedly supported on a cabinet. The tub includes a tub front 100 which is a front portion thereof and a tub rear 120 which is a rear portion thereof. The tub front 100 and the tub rear 120 are coupled with screws, to form a space for housing the drum therein. The tub rear 120 has an opening in a rear surface thereof. The tub rear 120 has an inside circumference of the opening in the rear surface connected to an outside circumference of a rear gasket 250. The rear gasket 250 has an inside circumference connected to a tub back 130. The tub back 130 has a pass through hole in a center thereof through which a rotational shaft passes. The rear gasket 250 is formed of a flexible material such that vibration does not transmit from the tub back 130 to the tub rear 120.

The rear gasket 250 is sealably connected to the tub back 130 and tub rear 120 respectively for preventing water from leaking from the tub. The tub back 130 vibrates together with the drum when the drum rotates, when the tub rear 120 is spaced from the tub back 130 adequately such that the tub back 130 does not interfere with the tub rear 120. The rear gasket 250 is formed of a flexible material, enabling the tub back 130 to make relative movement without interference with the tub rear 120. The rear gasket 250 has a corrugated portion which can be elongated enough to allow such relative movement of the tub back 130.

There is a foreign matter seizure preventive member 200 on a front side of the tub front 100 for preventing foreign matters from infiltrating into a space between the tub and the drum. The foreign matter seizure preventive member 200 is formed of a flexible material, and secured to the tub front 100. The foreign matter seizure preventive member 200 may be formed of a material the same with the rear gasket 250.

The drum has a drum front 300, a drum center 320, a drum back 340 and so on. There can be ball balancers mounted to a front and a rear of the drum, respectively. The drum back 340 is connected to a spider 350, and the spider 350 is connected to a rotational shaft 351. The drum is rotated within the tub by rotation force transmitted thereto through the rotational shaft 351.

The rotational shaft 351 is passed through the tub back 130 and connected to the motor, in a direct manner. In detail, a rotor of the motor (not shown) is connected to the rotational shaft, directly. A bearing housing 400 is coupled to a rear of the tub back 130. The bearing housing 400 rotatably supports the rotational shaft 351 between the motor and the tub back 130.

A stator 80 of the motor is fixedly mounted to the bearing housing 400. The rotor is positioned to surround the stator 80. The motor, being an outer rotor type, is connected to the rotational shaft, directly.

The bearing housing 400 is supported on the cabinet 600 through the suspension assembly. The suspension assembly includes three vertical supporting suspensions and two tilted suspensions mounted tilted in front/rear directions. The suspension assembly is connected to the cabinet base 600 to allow a certain extent of elastic deformation. That is, the suspension assembly is elastically supported with respect to supporting points which are connected to the base, such that a certain extent of rotation of the suspension assembly is allowed in the front/rear directions and the left/right directions with respect to the supporting point. To make such elastic supporting available, the vertical suspensions can be mounted to the base 600 with rubber bushings disposed therebetween. The suspensions can be configured such that the vertical suspensions elastically buffer vibration of the drum, and the tilted suspensions attenuate the vibration. That is, in a vibrating system which includes springs and damping means, the vertical suspensions serve as the spring and the tilted suspensions serve as the damping means. In this case, the three vertical supporting suspensions are springs or spring dampers (dampers which serve as dampers as well as springs), and the two tilted suspensions are non-spring dampers (dampers which do not serve as springs, but serve as dampers, simply). However, in the other embodiment, the tilted supporting suspensions can also be made to serve as the spring dampers.

Figure 2:
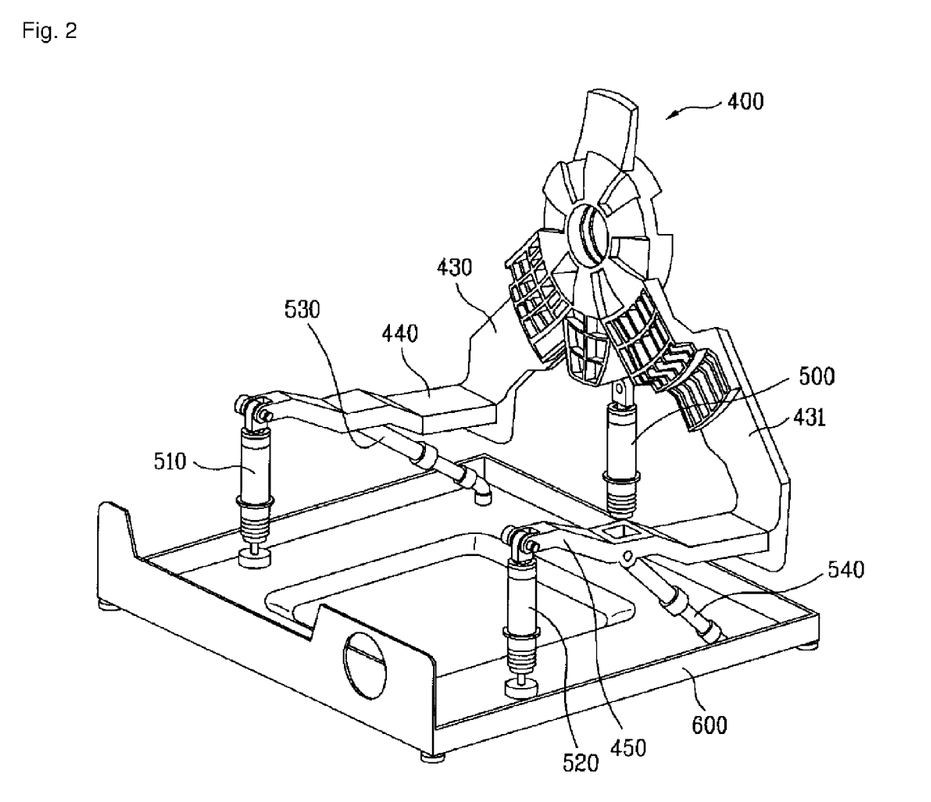
FIG. 2 illustrates a perspective view of a suspension assembly mounted to a base.

FIG. 2 illustrates a perspective view of the suspension assembly mounted to the base 600 in a state the suspension assembly is mounted to the bearing housing 400. The suspension assembly is connected to the bearing housing 400 for reducing the vibration of the drum.

The suspension assembly may include brackets for connecting the bearing housing 400 to the suspensions. Those brackets are a radial bracket which is a radial extension connected to the bearing housing 400 and extended in a radial direction, and an axial bracket which is a forward direction extension connected to the radial direction bracket and extended forward. The axial bracket is an extension in a direction of the rotational axis of the drum.

The radial bracket includes a first radial bracket 431 and a second radial bracket 430 which are arranged in symmetry.

The first radial bracket 431 and the second radial bracket 430 serve to connect the first axial bracket 450 and the second axial bracket 440 to the bearing housing 400, respectively.

The suspension assembly may include up/down direction suspensions for attenuation in the up/down directions and front/rear direction suspensions for attenuation in front/rear directions. The up/down direction suspensions may be arranged such that one of the up/down direction suspensions is positioned one a rear side, and two thereof on a front side of the center on a left side and a right side respectively. And, the front/rear direction suspensions may be arranged on a left side and a right side in the front/rear directions in tilted positions.

In detail, referring to FIG. 2, in the embodiment, the suspension assembly includes a first cylinder spring 520, a second cylinder spring 510 and a third cylinder spring 500, and a first cylinder damper 540 and a second cylinder damper 530.

The cylinder spring is mounted between the cylinder and the piston 624. Since the cylinder spring is a combination of a cylinder and a piston, a length thereof varies securely at the time of buffering. The cylinder is connected to the axial bracket, and the piston is connected to the base.

The cylinder damper has a piston moving in the cylinder for providing a damping effect by friction resistance.

The first cylinder spring 520 is connected between the first axial bracket 450 and the base 600. And, the second cylinder spring 510 is connected between the second axial bracket 440 and the base 600.

The third cylinder spring 500 is connected between the bearing housing 400 and the base 600, directly.

The first cylinder damper 540 is mounted tilted between the first axial bracket 450 and a rear side of the base, and second cylinder damper 530 is mounted tilted between the second axial bracket 440 and the rear side of the base.

The third cylinder spring 500 is arranged at a center of the rear side, and the first cylinder spring 520 and the second cylinder spring 510 are mounted on left/right sides of a front side of the base. And, between a rear side of the third cylinder spring 500 and a front side of the first cylinder spring 520 and the second cylinder spring 520, the first cylinder damper 540 and the second cylinder damper 530 are positioned. Those are symmetry in left/right directions.

The cylinder springs are connected to the base 600, with rubber bushings disposed therebetween.

In the meantime, the cylinder spring can be fabricated to exert a damping force, too. In this case, the cylinder spring becomes a spring damper. And, the cylinder damper may have a spring mounted thereto. In this case, the cylinder damper is not the non-spring damper any more, but is a spring damper.

In the embodiment, the tub is fixedly mounted to the cabinet, such that vibration of the drum is supportably buffered by the suspension assembly. Actually, it can be said that it is in a mode that supporting structures for supporting the tub and the drum are separated from each other, and it may also be said that it is in a mode that the drum does not vibrate even if the tub does. In detail, the tub can be seated to stand on the base 600 by itself, with a front thereof fixedly connected to a cabinet front (not shown), and a rear thereof fixedly connected to the cabinet rear 620.

Figure 3:
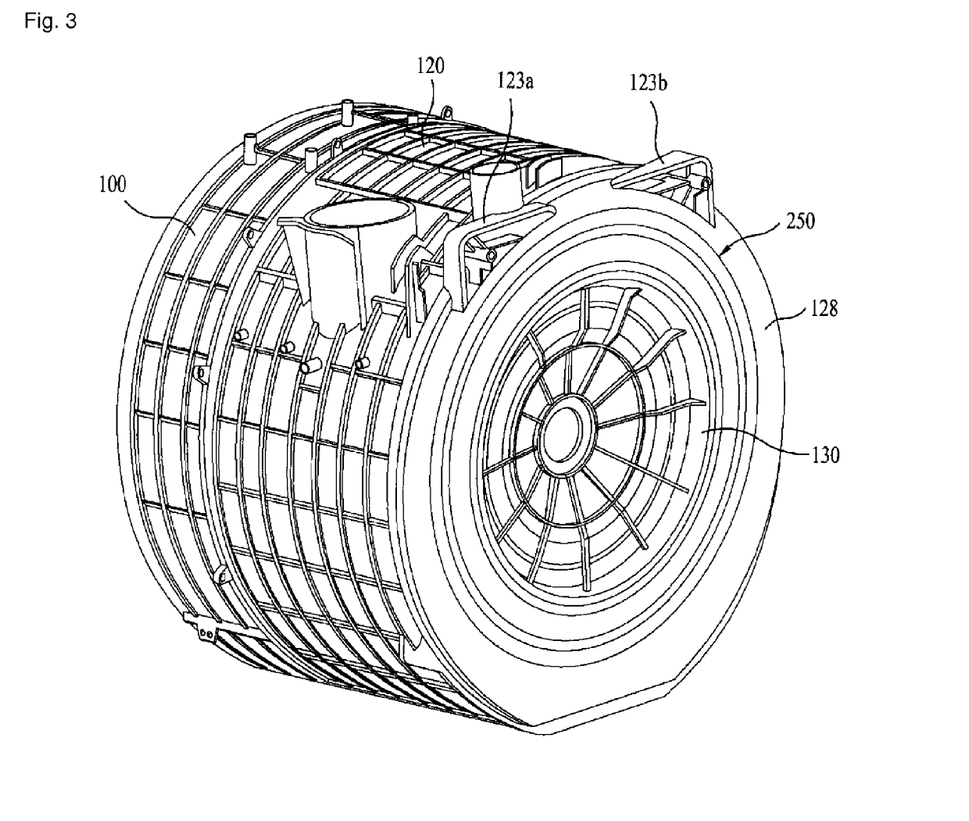
FIGS. 3 and 4 illustrate perspective views each showing a tub, a tub back and a rear gasket assembled together.
Figure 4:
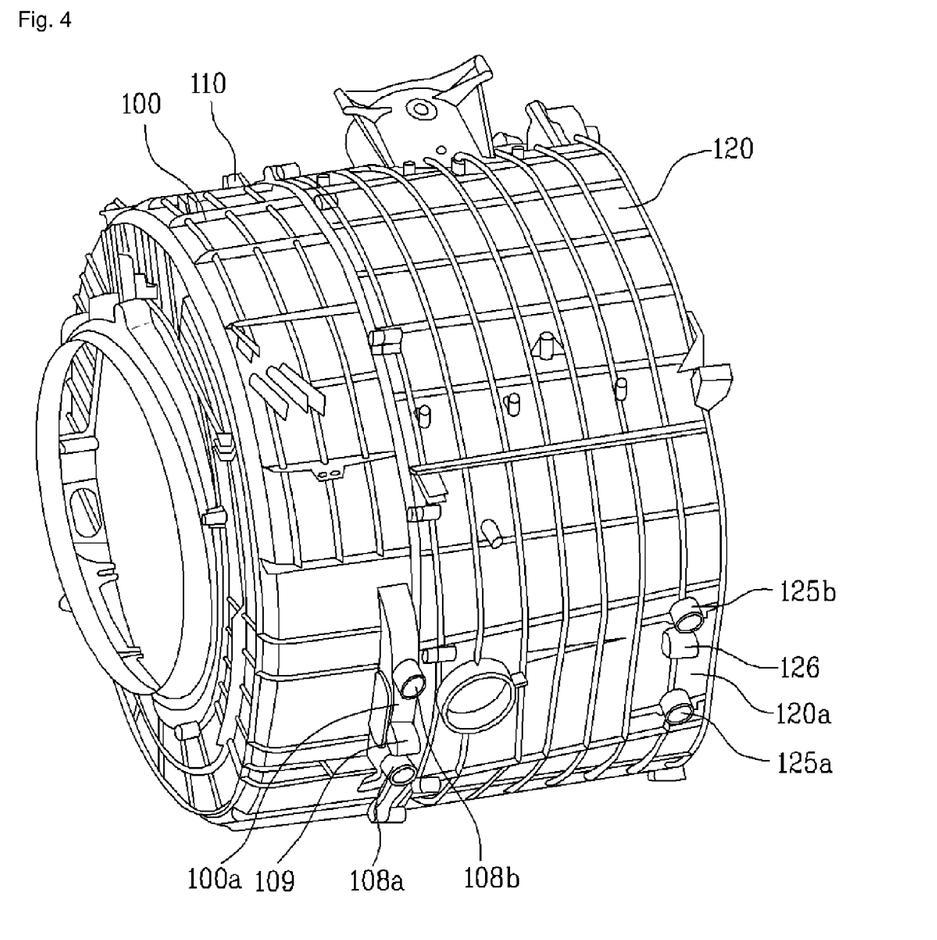
Figure 5:
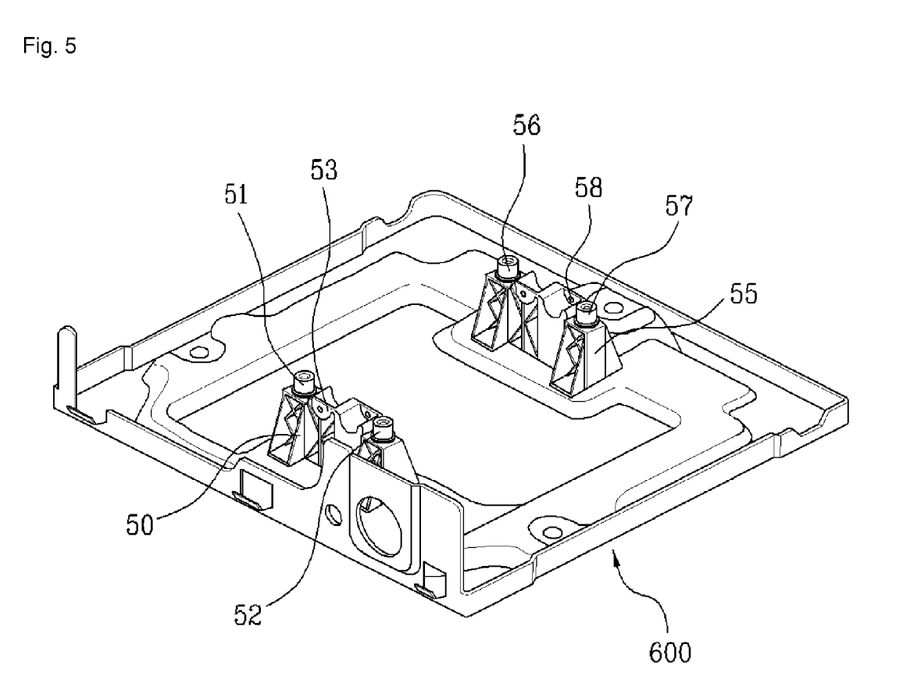
FIG. 5 illustrates a structure for seating a tub on a base plate.

FIGS. 3 and 4 illustrate perspective views each showing the tub front 100, the tub rear 120, the tub back 130 and the rear gasket 250 assembled together.

As described before, the tub front 100 is fixedly connected to the cabinet front. To make such a fixed connection available, four fastening bosses are formed around the laundry opening on a front thereof, substantially. After positioning the cabinet front in a state the tub front 100 is mounted, screws are fastened from a front side to a rear side to fasten the cabinet front.

Under the tub front 100, there is a base coupling portion for seating the tub front 100 to the base 600. The base coupling portion includes a cylindrical first hollow coupling portion 108a, a cylindrical second hollow coupling portion 108b, and a first screw fastening portion 109 for screw fastening. After the tub front 100 is positioned on the base 600, the first screw fastening portion 109 is fastened from a front side to a rear side with screws to couple the tub front 100.

The tub rear 120 is cylindrical to surround the drum, with a front opening opened as it is, and a rear having a donut shaped rear surface 128. The front side is sealably coupled to the tub front 100. The rear surface 128 of the tub rear 120 has a diameter greater than an outside diameter of the tub back 130, adequately. There is a gap that does not interfere with the rear surface 128 of the tub rear 120 even if the tub back 130 vibrates. In the gap, i.e., between the rear surface 128 of the tub rear 120 and the tub back 130, the rear gasket 250 is connected. The rear gasket 250 seals a space between the rear surface 128 of the tub rear 120 and the tub back 130. The rear gasket 250 may have an adequately flexible corrugated portion so as not to transmit the vibration from the tub back 130 to the tub rear 120.

The tub rear 120 has a coupling portion 123 for coupling to the cabinet rear 620.

The tub rear 120 is fixedly secured to the cabinet base 600, and to do this, the tub rear 120 has a third hollow coupling portion 125a, a third hollow coupling portion 125b and a second screw fastening portion 126 formed on lower side of the tub rear 120. The screw fastening portion is in a mode in which screws are fastened in a state the tub rear 120 is coupled to the base.

The second screw fastening portion 126 is positioned not on the same line with the first screw fastening portion 109 formed on the tub front 100 in front/rear directions, but off the line. When seen from a front side to a rear side, the first screw fastening portion 109 is arranged on a right side and the second screw fastening portion 126 is arranged on a left side.

The base coupling portion is provided to each of the tub front 100 and the tub rear 120 for providing interchangeability of the tub rear 120. Depending on capacities of the laundry machine, even though the tub front 100 of the same structure is used, the tub rear may be used interchangeably with ones having different lengths. In this instance, since there can be a requirement for changing the tub rear 120 in a state the tub front 100 is mounted to the base 600, it may be preferable that the base coupling portion is provided to both of the tub front 100 and the tub rear 120.

The mounting of the tub to a tub supporting front 50 and a tub supporting rear 55 will be described with reference to FIGS. 3 and 4. At first, a first rubber bushing 51 of the tub supporting front 50 is placed in the first hollow coupling portion 108a of the tub front 108b, and a second rubber bushing 52 of the tub supporting front 50 is placed in the second hollow coupling portion 108b. And, of the screw fastening portions 53 and 58 of the tub supporting front 50, the screw fastening portion 109 of the tub front 100 is seated on and fastened with screws to the screw fastening portion 53 on a right side thereof. In this instance, the screw is fastened from a front side to a rear side.

A third rubber bushing 56 of the tub supporting rear 55 is placed in the third hollow coupling portion 125a of the tub rear 120, and a fourth rubber bushing 57 of the tub supporting rear 55 is placed in the fourth hollow coupling portion 125b. And, of the screw fastening portions of the tub supporting rear 55, the screw fastening portion 126 of the tub rear 120 is seated on and fastened with screws to the screw fastening portion 58 on a left side thereof. In this instance, the screw is fastened from a rear side to a front side.

Since the laundry machine of the present invention has vibration of the tub reduced significantly, different from the related art, a gap for the vibration is not required, enabling an outside surface of the tub to position to the cabinet to the maximum. And, even if a size of the cabinet is not enlarged, a size of the tub can be enlarged, allowing to provide a result in which a capacity of the laundry machine is increased for an identical exterior size. Actually, a gap between the cabinet right 630 or the cabinet left 640 and the tub can be reduced to below 10 mm. In the embodiment, the gap between the outside surface of the tub and the cabinet is in a range of 5 mm. In this instance, if the ribs formed on the outside surface of the tub into account, the gap between the outside surface of the tub and the cabinet is in a range of 3 mm. In the related art laundry machine in which the tub vibrates with the drum, the gap is in a range of 30 mm for preventing the vibration of the tub from interfering with the cabinet. If a diameter of the tub is considered, the laundry machine of the present invention can have the diameter of the tub to be about 50 mm larger than the related art. As the size of the tub is enlarged thus, a volume of the drum mounted in the tub can be enlarged. Even if the laundry machine of the present invention has an identical exterior size with the related art laundry machine, a laundry machine of which washing capacity is increased by one stage can be obtained.

In the meantime, it may be favorable for assembly that the tub is not brought into contact with the cabinet right 630 or the cabinet left 640 even if the size of the tub is not enlarged. If the size of the tub is determined fit to left/right gaps in the cabinet (gaps between the cabinet right and the cabinet left), the assembly can be unfavorable due to the interference between the cabinet and the tub. Moreover, if the interference between the brackets of the suspension assembly and the tub is also taken into account, it can be favorable that the tub is enlarged to an extent in which the tub does not come into contact with the cabinet right 630 or the cabinet left 640. Accordingly, the tub can be fabricated enlarged to an extent in which the tub has a gap in a range of 3~10 mm to the cabinet right 630 or the cabinet left 640.

In this instance, the laundry opening in the drum may be the same or larger than a diameter of the laundry opening in the tub, actually. The drum may have a front end extended forward to form the laundry opening. In this instance, the front end of the drum is positioned in rear of the laundry opening in the tub. Furthermore, the front end of the drum is positioned in rear of a front inside wall of the tub. In the embodiment, the drum is positioned in a space between the front wall and the rear wall of the tub.

Figure 6:
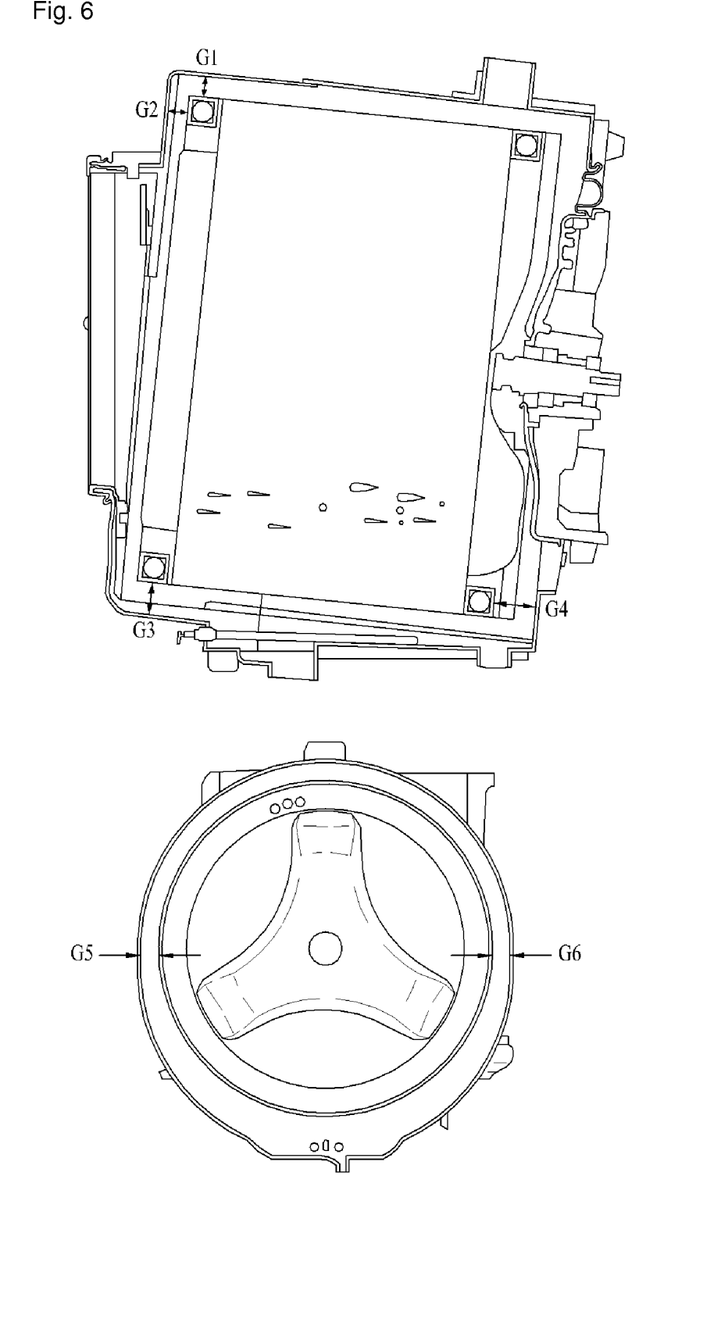
FIG. 6 illustrates longitudinal and transverse sections each for showing gaps between a drum and a tub.

The gap between the drum 300 and the tub will be described with reference to FIG. 6. It is preferable that the gaps are provided such that the gap between a front top side of the drum and an inside circumferential surface of a top of the tub is smaller than the gap between a front bottom of the drum and an inside circumferential surface of a bottom of the tub.

That is, the gap G1 between the outside circumferential surface of the top side of the drum and the inside circumferential surface of the top of the tub is provided smaller than the gap G3 between the outside circumferential surface of the bottom of the drum and the inside circumferential surface of the bottom of the tub. This is because the drum can translocate downward once the laundry is introduced to the drum.

In the meantime, with regard to the gaps between the outside circumferential surface of a rear side of the drum and the inside circumferential surface of the rear side of the tub, it can also be made that a top side gap is smaller than bottom side gap under the same reason.

It is preferable that the gap G2 between a front surface of the drum and an inside front surface of the tub is set such that no interference is caused at the time the drum vibrates in front/rear directions. Particularly, the gap G2 may take the gap between a front end of an outside circumferential surface of the tub front and an inside surface of the tub in front of the front end of an outside circumferential surface of the tub front into account. In this instance, the gap G2 between the drum and the tub may be a gap taking the ball balancers mounted to the drum front into account (the gaps described in other portions in the specification alike). If the ball balancer is provided, the gap can be a gap between a front of the ball balancer and the inside surface of the tub which is positioned in front of the ball balancer.

Therefore, it is required that the drum front 300 and the front inside circumferential surface maintain a gap enough to prevent the drum from interfering with the tub even if the drum vibrates in the front/rear directions.

In the meantime, it is required that the gap G4 between the drum back 340 and the rear inside circumferential surface of the tub is provided such that the drum back 340 or the spider 350 does not interfere with the back side of the tub at the time the drum rotates.

That is, it is required that the gap G4 is designed taking front/rear direction vibration into account since the front/rear direction vibration can take place when the drum rotates.

Moreover, left/right direction gaps between an outside circumferential surface of the drum and an inside circumferential surface of the tub taking the left/right direction vibration of the drum into account.

In this instance, if a left/right direction gap is minimized by making a translocation of the drum to the minimum. The diameter of the drum is related to a capacity of the laundry machine. As the greater the diameter of the drum becomes, the greater an inside volume of the drum becomes, enabling to make the capacity of the laundry machine the greater. Of a front/rear direction width, a left/right direction width, an up/down direction width of the laundry machine, in a case the left/right direction width is the smallest, the diameter of the drum can not, but be determined taking the left/right direction width into account. In this instance, since, if left/right direction movement of the drum is minimized, the left/right direction gap between the drum and the tub can be minimized, the diameter of the drum can be maximized.

Of the gaps between the drum and the tub, the diameter of the drum can be maximized as far as possible by making a sum of gaps(G5+G6) in the left/right directions to be smaller than a sum of other gaps(G1+G3 or G2+G4). In the embodiment, the drum and the tub have a relation in which the sum of the left/right direction gaps(G5+G6)<the sum of the front/rear direction gaps(G2+G4)<the sum of the up/down direction gaps(G1+G3).

The gaps G1, G2, G3, G4, G5 and G6 may be defined as gaps which take the interference between the drum and the tub into account. Therefore, if one component is to be mounted at a position with the gap, it is required to determine the gap taking the component into account. The case of the ball balancer can be one example. For convenience's sake, the gaps may be called as interference gaps. That is, it can be defined that the G1 is an up/down direction interference gap of the tub to the front top side of the drum, the G2 is a front/rear direction interference gap of the tub to the front top side of the drum, the G3 is an up/down direction interference gap of the tub to the front bottom side of the drum, the G4 is a front/rear direction interference gap of the tub to the front bottom side of the drum, the G5 is a left/right direction interference gap of the tub to the right side of the drum, and the G6 is a left/right direction interference gap of the tub to the left side of the drum. In this instance, the right side or the left side denotes a left side or a right side of the laundry machine when the laundry machine is seen in rear of the laundry toward the front side of the laundry machine.

In order to minimize the left/right direction translocation of the drum at the time of vibration of the drum, the suspension assembly may be fabricated such that rigidity (or stiffness) thereof with respect to a left/right direction translocation of the drum is greater than the rigidity thereof with respect to a up/down direction translocation or a front/rear direction translocation of the drum. Under the same reason, the axial bracket can be designed such that second moment of area thereof with respect to an up/down direction axis is greater than second moment of area thereof with respect to a left/right direction axis.

Referring to FIG. 2, spring dampers 510 and 520 and simple dampers 530 and 540 are rotatably connected to axial brackets respectively such that the spring dampers 510 and 520 and simple dampers 530 and 540 have left/right direction rotation axes respectively, a spring damper 500 is rotatably connected such that the spring damper 500 has a front/rear direction rotational axis.

Such connection of the spring dampers 510 and 520 and simple dampers 530 and 540 helps reduce left/right direction translocation of the drum. And, the spring damper helps reduce left/right direction translocation of the drum. The dampers 500~540 reduce up/down direction vibration of the drum. In the embodiment, most of the vibration of the drum will take place in the up/down direction, and has a left/right direction vibration of which translocation is small.

In the present invention, rigidity against the left/right direction translocation is greater than rigidity against the front/rear direction translocation, and the rigidity against the front/rear direction translocation is greater than the rigidity against the up/down direction translocation.

In the meantime, as described before, in order to make a volume of the drum greater as far as possible, it is required to make the volume of the tub greater, too. Particularly, the greater the left/right direction width of an inside circumferential surface of the tub, the diameter of the drum can be made the greater. To do this, it is favorable that the left side and the right side of the tub are extended so as to be in contact with the cabinet left and the cabinet right, or to be close to the cabinet left and the cabinet right as far as possible, respectively. Preferably, with reference to a left/right direction horizontal line passing though a drum center, by making a difference between the left/right direction width (a distance between the cabinet front and the cabinet right) and an outside diameter of the drum to be below 100 mm, the volume of the drum can be made greater compared to the related art laundry machine having the same left/right direction width, thereby enabling to provide a laundry machine having an increased capacity. Since the smaller the left/right direction translocation of the drum, as the diameter of the drum can be made the greater, it is favorable for increasing the capacity. However, making the left/right direction translocation of the drum to be smaller implies that left/right direction supporting rigidity of the suspension assembly with respect to the drum is great. If the rigidity is great excessively, a vibration characteristic of the drum can be unfavorable. For an example, if the drum rotates at a high speed, abnormal vibration can take place in a steady state region over approx. 400 rpm. In such a point of view, it is favorable that the difference between the left/right direction width (a distance between outside surfaces of the cabinet front and the cabinet right) and an outside diameter of the drum is maintained be greater than 80 mm.

In spinning, a transient vibration region can take place in which an amplitude of the vibration becomes greater due to resonance as the rotation speed of the drum increases, and if the rotations peed increases further to pass the transient vibration region, the vibration reaches to a steady state in which the amplitude of the vibration drops to a comparatively low fixed level. The abnormal vibration can be a vibration phenomenon in which increasing and decreasing of the amplitude of the drum repeats or the amplitude of the vibration becomes abnormally great.

With reference to a left/right direction horizontal line passing though a drum center, the gap between the left side or right side of the drum to the tub can be made to be 1.5 times of the gap between the left side or right side of the tub and the cabinet left or the cabinet right. That is, by reducing the gap between the left side or right side of the tub and the cabinet left or the cabinet right, the diameter of the drum can be made greater as far as possible. By enlarging the tub close to the cabinet to the maximum, to secure an inside space thereof, enabling to enlarge the diameter of the drum, a laundry machine of which capacity is enlarged significantly can be provide even if exterior sizes thereof are identical. However, if the tub is close to the cabinet right or the cabinet left excessively, there can be inconvenience in assembly work, and since there are cases when components which are required not to interfere with the tub (for an example, the axial bracket) are also required not to interfere with the cabinet right or the cabinet left, a design can be made such that the ratio does not exceed 8 taking above into account.

The smaller the difference between a size of the cabinet and the diameter of the drum which rotates and vibrates in the cabinet becomes, the greater the capacity of the drum becomes to the maximum under the limitation of the exterior size of the laundry machine. And, the difference enables the capacity of the laundry machine greater in comparison to the exterior size of laundry machine. The capacity of the laundry machine can be determined by a maximum amount of laundry, i.e., a laundry amount, the laundry machine can wash. For an example, a 9 kg, or 11 kg class washing machine has the maximum laundry amount of 9 kg, or 11 kg, respectively. In general, since the volumes of the drum and the tub are required to increase as the capacity of the laundry machine increases, the exterior size of the laundry machine can not, but increase.

The embodiment enables to provide a laundry machine having a capacity increased more than the related art laundry machine with reference to the exterior size, particularly the left/right direction width, of the laundry machine. Though a 24-inch size related art laundry machine can provide a capacity of 9 kg class, the laundry machine of the embodiment can provide a capacity of 11 kg class. In other words, with regard to the 24-inch size, a laundry machine is made available, which exceeds the capacity available in the related (for an example, greater than 9.5 kg), but of which capacity is below 11 kg. On the other hand, the volume of the drum can be increased up to about 78 liters. With regard to the 24-inch size, the volume of the drum can be in a range of 65 liters to 78 liters.

In a case of 27-inch size, a laundry machine having a capacity of below 13 kg which exceeds the capacity in the related art can be provided.

In the meantime, despite of the name of the rear gasket, the rear gasket can be formed of various materials. In general, other than materials which are used for formation of a gasket, if a gasket can be formed of a material that can reduce a rate of vibration transmission from the drum to the tub, the material can also be utilized. Along with this, if a shape of the rear gasket can comparatively minimize the vibration transmission from the drum to the tub, a design of the rear gasket can be modified to have the shape.

It is required to understand that names used for elements of the present invention are not interpreted limited to meaning in a dictionary or technical meaning. At least some of the names of the elements may include names given for convenience's sake, but not limit a material, a function, or a shape of the element. It is required that the elements of the present invention are defined and interpreted by functions and services of the elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The present invention relates to a laundry machine. In an embodiment, a displacement of the drum may be relatively smaller in a left-and-right direction than in other directions. To this end, the suspension assembly may be configured that a stiffness thereof for a displacement of the drum is greater in a left-and-right direction than in an up-and-down or front-and-rear direction. The present invention may provide with a laundry machine having an enlarged capacity.

The invention claimed is:

1. A laundry machine, comprising:
   a tub to hold water therein and having an opening formed in a front surface of the tub through which laundry is inserted into the tub;
   a drum rotatably disposed in the tub;
   a drive assembly including a shaft connected to the drum, a bearing housing to rotatably support the shaft, and a motor to rotate the shaft; and
   a suspension assembly to reduce vibration of the drum, wherein the suspension assembly is configured such that a stiffness thereof for a displacement of the drum is greater in a left-and-right direction than in a front-andrear direction and is greater in the front-and-rear direction than in an up-and-down direction, and wherein the suspension assembly includes an axially-extended bracket that extends in a direction of a rotational axis of the drum, and at least three suspensions which are arranged in a triangle, first and second suspensions of which are located at a front side of a center of the drum, and a third suspension of which is located at a rear side of the center of the drum, and wherein the first and second suspensions are hinged to the bracket with a hinge axis along the left-and-right direction and the third suspension is hinged to the bracket with a hinge axis along the front-and-rear direction.

2. The laundry machine as claimed in claim 1, wherein the first, second, and, third suspensions are spring dampers.

3. The laundry machine as claimed in claim 1, wherein the suspension assembly is attached to the bearing housing.

4. The laundry machine as claimed in claim 1, further comprising:

a flexible material to prevent the water inside the tub from leaking toward the drive assembly and to allow the drive assembly to move relatively to the tub.

5. The laundry machine as claimed in claim 1, wherein the tub is supported more rigidly than the drum.

6. The laundry machine as claimed in claim 2, wherein the suspension assembly further comprises fourth and fifth suspensions hinged to the bracket with a hinge axis along the left-and-right direction.

7. The laundry machine as claimed in claim 6, wherein the fourth and fifth suspensions are non-spring dampers.

8. The laundry machine as claimed in claim 6, wherein the first, second, and third suspensions are vertically oriented with respect to a base of the laundry machine, and the fourth and fifth suspensions are oriented at an incline with respect to the base of the laundry machine.

* * * * *